United States Patent
Hara et al.

(10) Patent No.: US 10,584,798 B2
(45) Date of Patent: Mar. 10, 2020

(54) VALVE DEVICE

(71) Applicants: DENSO CORPORATION, Kariya, Aichi-pref. (JP); HONDA MOTOR CO., LTD., Tokyo (JP)

(72) Inventors: Tetsuya Hara, Kariya (JP); Yuki Ono, Wako (JP); Makoto Yoshida, Wako (JP)

(73) Assignees: DENSO CORPORATION, Kariya (JP); HONDA MOTOR CO., LTD., Tokyo (JP)

( * ) Notice: Subject to any disclaimer, the term of this patent is extended or adjusted under 35 U.S.C. 154(b) by 105 days.

(21) Appl. No.: 15/915,228

(22) Filed: Mar. 8, 2018

(65) Prior Publication Data

US 2018/0283564 A1      Oct. 4, 2018

(30) Foreign Application Priority Data

Mar. 28, 2017   (JP) .................................. 2017-63223

(51) Int. Cl.
| | |
|---|---|
| *F16K 11/07* | (2006.01) |
| *F16H 61/02* | (2006.01) |
| *F16K 1/42* | (2006.01) |

(52) U.S. Cl.
CPC ............... *F16K 11/07* (2013.01); *F16K 1/42* (2013.01); *F16H 61/0276* (2013.01); *F16H 2061/0279* (2013.01); *Y10T 137/8671* (2015.04)

(58) Field of Classification Search
CPC ........ F16K 11/07; F16K 11/0704; F16K 1/42; F16K 27/041; F16K 27/044; F16H 2061/0279; F16H 61/0276; Y10T 137/8663; Y10T 137/8671
USPC .................... 137/625.66, 625.69, 115.13
See application file for complete search history.

(56) References Cited

U.S. PATENT DOCUMENTS 6,722,385 B1   4/2004 Bolaski

FOREIGN PATENT DOCUMENTS

| JP | 2001-280457 | 10/2001 |
| JP | 2006-300197 | 11/2006 |
| JP | 4460107 | 2/2010 |

*Primary Examiner* — Kevin F Murphy
*Assistant Examiner* — Kelsey E Cary
(74) *Attorney, Agent, or Firm* — Nixon & Vanderhye P.C.

(57) ABSTRACT

In a seat component received in a receiving region of a first body of a body, one surface of a contacting portion and one surface of an engaging portion are planar and are flush with each other, and the other surface of the contacting portion and the other surface of the engaging portion are planar and are flush with each other. The engaging portion engages two portions of the first body, which form one opening of the receiving region, in a state where a distal end of the seat component reaches another opening of the receiving region. Furthermore, in the state where the engaging portion engages the portions of the first body, a second body of the body covers the one opening and contacts the engaging portion. Thereby, the engaging portion engages the three portions of the body, so that movement of the seat component is effectively limited.

5 Claims, 4 Drawing Sheets

VALVE DEVICE

CROSS REFERENCE TO RELATED APPLICATION

This application is based on and incorporates herein by reference Japanese Patent Application No. 2017-63223 filed on Mar. 28, 2017.

TECHNICAL FIELD

The present disclosure relates to a valve device including a body that forms an oil pressure circuit, which is configured to supply an oil pressure to a friction element of a transmission of a vehicle.

BACKGROUND

Previously, there is known a valve device that includes a body, a valve element in a form of a spool, and a seat component in a form of a plate (see, for example, JP446010762).

With reference to FIGS. 5 and 6, a disadvantage of a previously proposed valve device of the above kind will be described. As shown in FIGS. 5 and 6, in the previously proposed valve device 100, a body 101 forms an oil pressure circuit that supplies an oil pressure to each corresponding one of a plurality of friction elements of a transmission of a vehicle, and a valve element 102 is received in a hole 103 of the body 101 in a manner that enables movement of the valve element 102 in an axial direction of the valve element 102. Furthermore, a seat component 104 is bent into an L-shape. A bent end portion 104L of the seat component 104, which is bent in this way, is engaged to the body 101 at an inside of the body 101. Thereby, the seat component 104 is positioned in the inside of the body 101 such that removal of the valve element 102 from the hole 103 of the body 101 toward one side in the axial direction of the valve element 102 is limited by the seat component 104.

The body 101 includes a first body 101A and a second body 101B. The first body 101A has the hole 103. The second body 101B is formed separately from the first body 101A. The first body 101A has a receiving region 105, which is formed as a receiving space and receives the seat component 104. The hole 103 opens to the receiving region 105 on the one side in the axial direction of the valve element 102. Furthermore, the receiving region 105 has two openings 105a, 105b that open to an outside of the first body 101A and are configured to enable insertion of a plate having a plate thickness, which is equal to a plate thickness of the seat component 104, through the first body 101A in a state where a plane of the plate is kept perpendicular to the axial direction of the valve element 102. These openings 105a, 105b of the receiving region 105 are opposed to each other in a direction perpendicular to the axial direction of the valve element 102.

The seat component 104 is inserted into the receiving region 105 such that a distal end portion 104T of the seat component 104, which is opposite from the bent end portion 104L, is first inserted into the opening 105a until the distal end portion 104T reaches the opening 105b. Then, the opening 105a is covered with the second body 101B. At this time, a base of the bent end portion 104L, at which the bent end portion 104L is bent relative to the rest of the seat component 104, is engaged to a specific portion 105as of the first body 101A, which forms the opening 105a. Because of this engagement of the bent end portion 104L, removal (detachment) of the seat component 104 from the receiving region 105 is limited. Furthermore, the seat component 104 functions as a spring seat for a spring 106 that urges the valve element 102 toward the other side in the axial direction of the valve element 102.

However, in the above construction, there is a possibility of that the bent end portion 104L is urged against the specific portion 105as to cause tilting of the seat component 104. When the seat component 104 is tilted, the valve element 102 makes a one-sided contact with the seat component 104. As an example of the one-sided contact, FIG. 5 shows a state where a lower portion of the valve element 102 makes a contact with the seat component 104 while an upper portion of the valve element 102 is spaced from the seat component 104.

In view of the above disadvantage, there is disclosed a seat component, in which both of a front surface and a back surface of the seat component are formed as planar surfaces, respectively, which are parallel to each other without bending the seat component into the L-shape while the seat component has a projection that projects in a direction parallel to the planar surfaces of the seat component in a plan view of the seat component, and a side edge of the projection is engaged to the body to limit the removal (detachment) of the seat component (see, for example, JP2006-300197A).

However, in the valve device of JP2006-300197A, although the removal (detachment) of the seat component can be limited, the seat component is movable in a direction parallel to the plane of the seat component in the receiving region, and thereby the position of the seat component is not stable. Furthermore, when the position of the spring is deviated in response to the movement of the seat component, an output characteristic of the valve device may possibly be changed, and/or wearing of a wall surface of a receiving region of the valve element, which receives the spring, may possibly occur due to buckling of the spring.

Therefore, there is a demand for a structure that can limit movement of a seat component in a direction parallel to a plane of the seat component while limiting removal (detachment) of the seat component.

SUMMARY

The present disclosure is made in view of the above disadvantages, and it is an objective of the present disclosure to provide a valve device that limits movement of a seat component in a direction parallel to a plane of the seat component while limiting removal of the seat component from a body that forms an oil pressure circuit, which is configured to supply an oil pressure to a friction element of a transmission of a vehicle.

A valve device of the present disclosure includes a body, a valve element in a form of a spool, and a seat component in a form of a plate, as described below. The body forms an oil pressure circuit, which is configured to supply an oil pressure to a friction element of a transmission of a vehicle. The valve element is received in a hole of the body in a manner that enables movement of the valve element in an axial direction of the valve element. The seat component limits removal of the valve element from the hole of the body toward one side in the axial direction of the valve element. The body includes at least a first body, in which the hole is present, and a second body, which is formed separately from the first body. The first body has a receiving region that receives the seat component while the hole opens to the receiving region on the one side in the axial direction of the valve element.

The receiving region has at least two openings that open to an outside of the first body and are configured to enable insertion of a plate that has a plate thickness, which is equal to a plate thickness of the seat component, through the first body in a state where a plane of the plate is kept to be perpendicular to the axial direction of the valve element. Furthermore, the seat component is placed on the one side of the valve element in the axial direction of the valve element in a state where a plane of the seat component is perpendicular to the axial direction of the valve element. The seat component includes a contacting portion, which is configured to contact the valve element, and an engaging portion, which is configured to engage the body.

A front surface of the contacting portion and a front surface of the engaging portion are planar and are flush with each other, and a back surface of the contacting portion and a back surface of the engaging portion, which are parallel to and are opposite from the front surface of the contacting portion and the front surface of the engaging portion, respectively, in the axial direction of the valve element, are planar and are flush with each other. The engaging portion is configured to engage at least two portions of the first body, which form one of the at least two openings, in a state where a distal end of the seat component reaches another one of the at least two openings after insertion of the distal end of the seat component through the one of the at least two openings. The second body covers the one of the at least two openings and contacts the engaging portion in a state where the engaging portion engages the at least two portions of the first body.

Thereby, the engaging portion engages the three portions of the body, so that the movement of the seat component is effectively limited. Thus, removal (detachment) of the seat component from the body can be limited, and the movement of the seat component in the direction parallel to the plane of the one surface of the contacting portion and the one surface of the engaging portion can be limited.

BRIEF DESCRIPTION OF THE DRAWINGS

The present disclosure, together with additional objectives, features and advantages thereof, will be best understood from the following description, the appended claims and the accompanying drawings in which:

DETAILED DESCRIPTION

Figure 1:
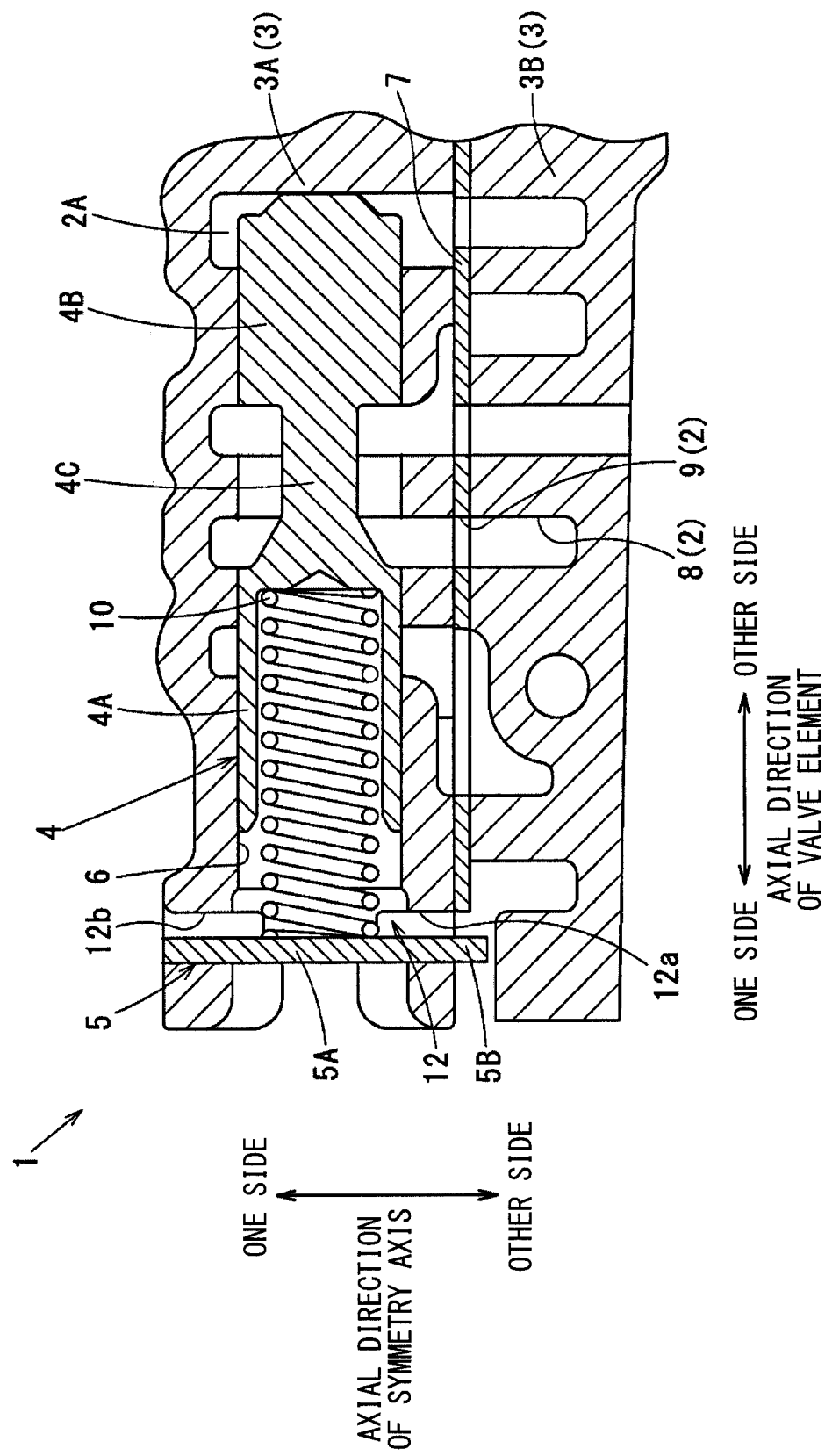
FIG. 1 is a cross-sectional view of a valve device according to an embodiment of the present disclosure.

Hereinafter, an embodiment of the present disclosure will be described. Here, it should be noted that the following embodiment discloses a specific example, and the present disclosure is not necessarily limited to the following embodiment.

Structure of Embodiment

A structure of a valve device 1 of the present embodiment will be described with reference to FIGS. 1 to 4.

The valve device 1 includes a body 3, which forms an oil pressure circuit 2 that is configured to supply an oil pressure to each corresponding one of a plurality of friction elements of a transmission of a vehicle (e.g., an automobile). The valve device 1 forms a part of a drive force transmitting device that transmits a drive force generated from an internal combustion engine to drive wheels of the vehicle. The valve device 1 is used in the oil pressure circuit 2 to change an oil passage and/or to adjust the oil pressure.

Hereinafter, the valve device 1 will be described in detail.

The valve device 1 includes the body 3, a valve element 4 in a form of a spool, and a seat component 5 in a form of a plate, as described below.

First of all, the body 3 constitutes the oil pressure circuit 2 that is configured to supply the oil pressure to each corresponding one of the friction elements of the transmission of the vehicle.

The body 3 includes a first body 3A and a second body 3B. The first body 3A has a hole 6 that receives the valve element 4. The second body 3B is formed separately from the first body 3A. The first and second bodies 3A, 3B are stacked and are joined together with bolts (not shown) while a separate plate 7 is held between the first and second bodies 3A, 3B. A plurality of grooves 8 is formed at contact surfaces of the first and second bodies 3A, 3B, which contact with each other. Furthermore, the separate plate 7 has a plurality of holes 9, each of which communicates between a corresponding one of the grooves 8 of the first body 3A and a corresponding one of the grooves 8 of the second body 3B. The oil pressure circuit 2 is formed by the grooves 8 and the holes 9 in the above described manner.

The valve element 4 is received in the hole 6 of the body 3 in a manner that enables movement (reciprocating movement) of the valve element 4 in an axial direction of the valve element 4. The valve element 4 has two land portions 4A, 4B and a shaft portion 4C. The land portions 4A, 4B slidably contact an inner peripheral wall of the hole 6. The shaft portion 4C has an outer diameter, which is smaller than an outer diameter of the land portions 4A, 4B, and the shaft portion 4C joins between the land portion 4A and the land portion 4B. Hereinafter, a left side of FIG. 1 will be referred to as one side in the axial direction of the valve element 4, and a right side of FIG. 1 will be referred to as the other side in the axial direction of the valve element 4. A space 2A, into and out of which hydraulic oil flows, is formed on the other side of the land portion 4B in the axial direction of the valve element 4.

The valve element 4 is urged by the spring 10 toward the other side in the axial direction of the valve element 4. For example, when the hydraulic oil is supplied into the space 2A, the valve element 4 is moved by the oil pressure of the hydraulic oil toward the one side in the axial direction of the valve element 4 against the urging force of the spring 10. In contrast, when the hydraulic oil is discharged from the space 2A, the valve element 4 is moved toward the other side in the axial direction of the valve element 4 by the urging force of the spring 10. The changing of the oil passage and/or the adjusting of the oil pressure are executed through the movement of the valve element 4 discussed above.

The seat component 5 limits removal of the valve element 4 and the spring 10 from the hole 6 toward the one side in the axial direction of the valve element 4. The seat component 5 is made of a metal plate and is formed integrally in one piece. The first body 3A has a receiving region 12 that is formed as a receiving space and receives the seat component 5 while the hole 6 opens to the receiving region 12 on the one side in the axial direction of the valve element 4. The receiving region 12 has two openings 12a, 12b (also referred to as one opening and the other opening, respectively, or a first opening and a second opening, respectively) that open to an outside of the first body 3A and are configured to enable insertion of a plate that has a plate thickness, which is equal to a plate thickness of the seat component 5, through the first body 3A (more specifically, the receiving region 12 of the first body 3A) in a state where a plane of the plate is kept perpendicular to the axial direction of the valve element 4. Here, the plate thickness is defined as a thickness of the plate measured in a direction perpendicular to a plane of the plate. The openings 12a, 12b of the receiving region 12 are opposed to each other in a predetermined direction (more specifically, an axial direction of a symmetry axis S of the seat component 5 shown in FIGS. 1 and 2) that is perpendicular to the axial direction of the valve element 4.

The seat component 5 is placed on the one side of the valve element 4 in the axial direction of the valve element 4 in a state where a plane of the seat component 5 is perpendicular to the axial direction of the valve element 4. The seat component 5 includes a contacting portion 5A and an engaging portion 5B. The contacting portion 5A is configured to contact the valve element 4 when the valve element 4 is urged against the contacting portion 5A. The engaging portion 5B is configured to engage predetermined portions of the body 3 (more specifically, predetermined portions 12aa, 12ab of the first body 3A and a predetermined portion 3Ba of the second body 3B described later).

The spring 10 is interposed between the contacting portion 5A and the land portion 4A, which is placed on the one side of the other land portion 4B in the axial direction of the valve element 4. The land portion 4A is shaped into a tubular form such that the land portion 4A opens on the one side in the axial direction of the valve element 4, and the other end of the spring 10, which is opposite from the seat component 5, is supported by an inner wall of the valve element 4 at the inner peripheral side of the land portion 4A.

Figure 2:
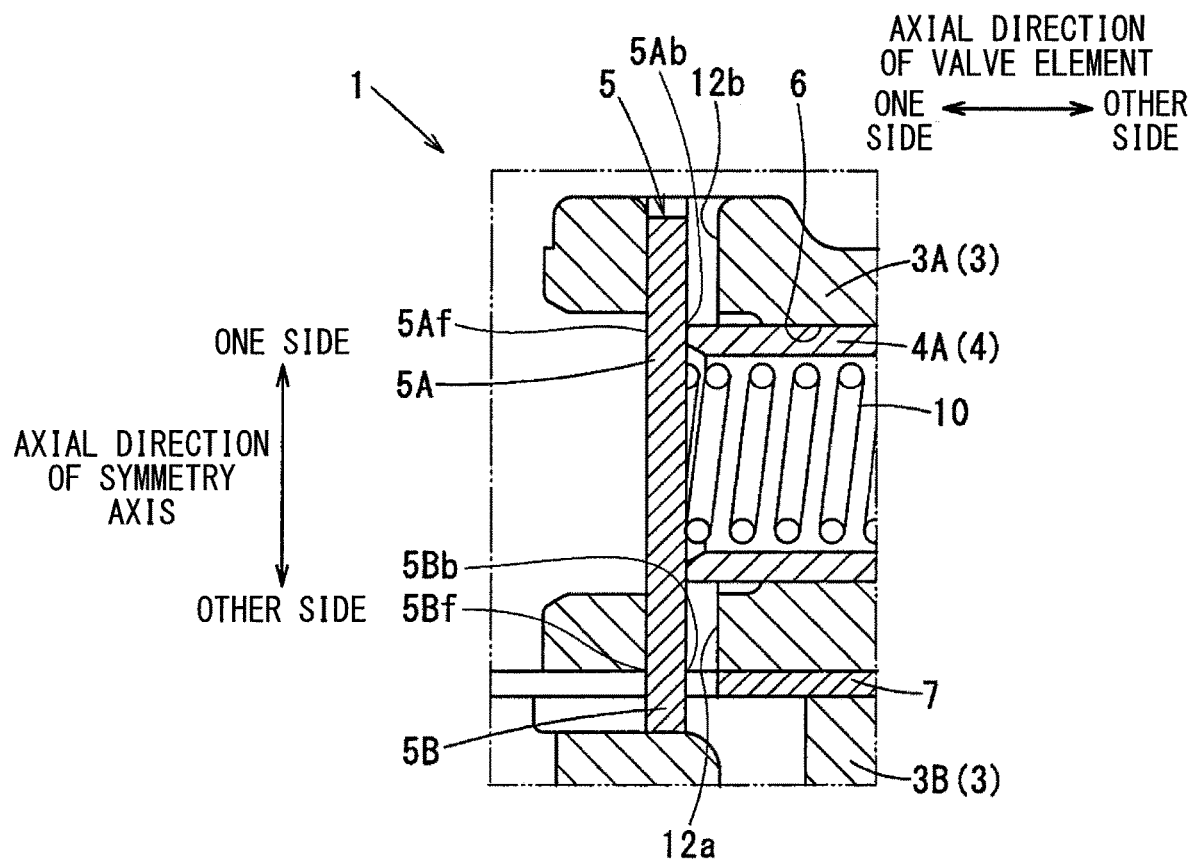
FIG. 2 is an enlarged cross-sectional view showing a state where a valve element contacts a seat component according to the embodiment.
Figure 3:
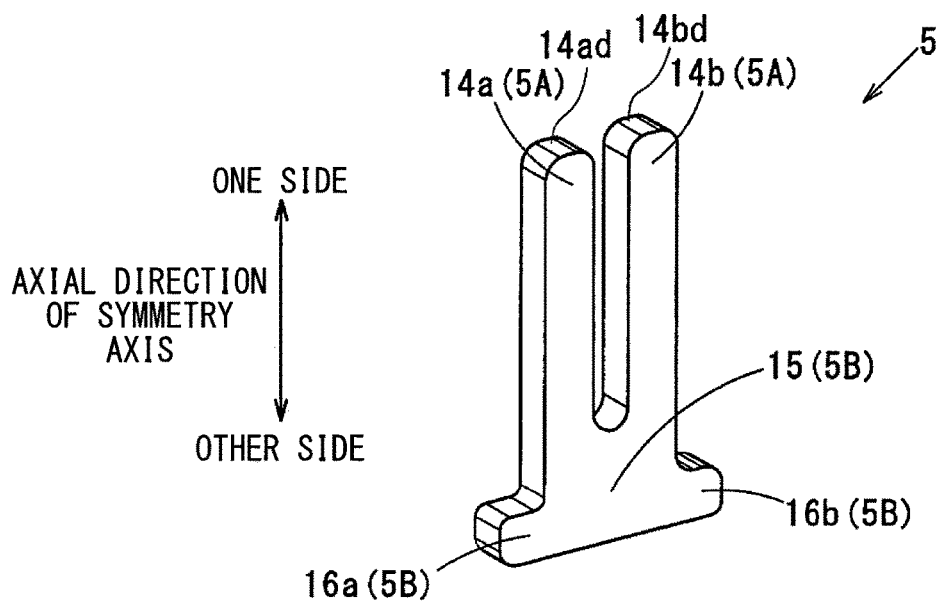
FIG. 3 is a perspective view of the seat component according to the embodiment.
Figure 4:
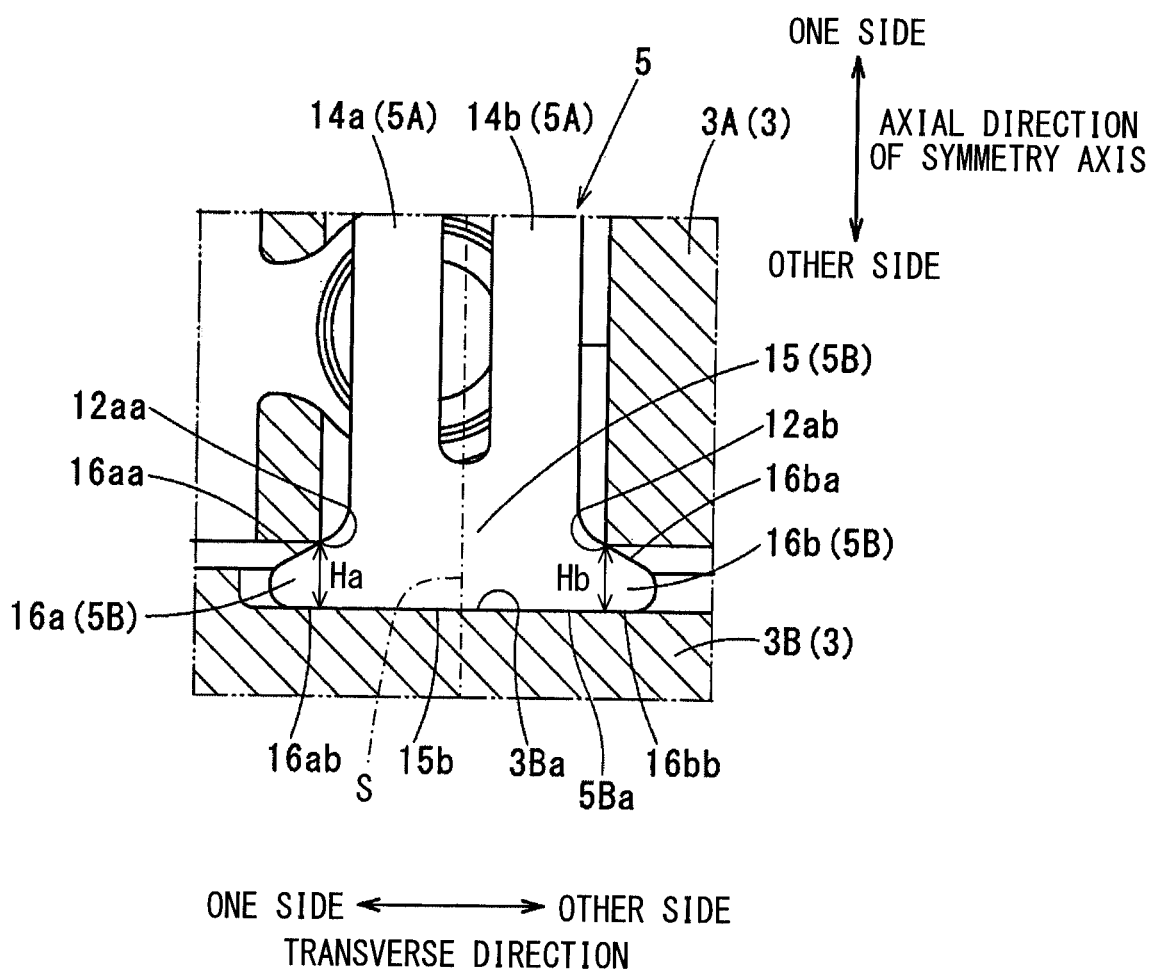
FIG. 4 is a descriptive view showing an engaged state where the seat component and the body are engaged with each other according to the embodiment.
Figure 5:
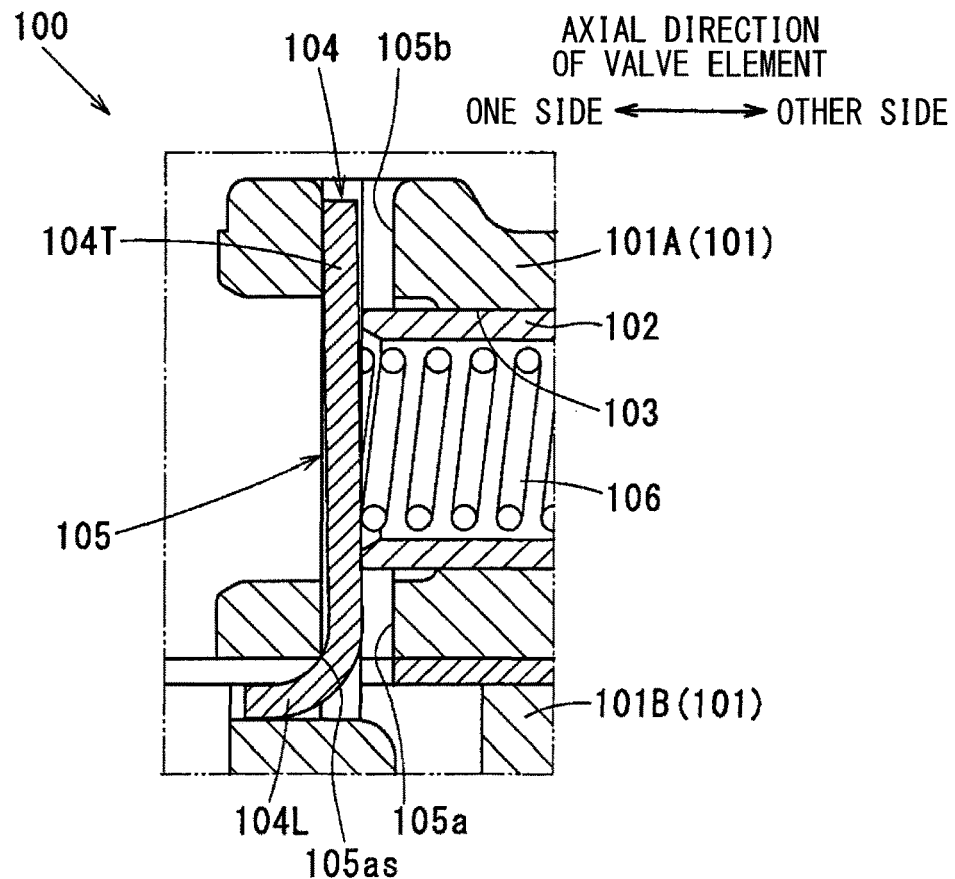
FIG. 5 is a descriptive view showing a state where a valve element makes a one-sided contact with a seat component in a related art.
Figure 6:
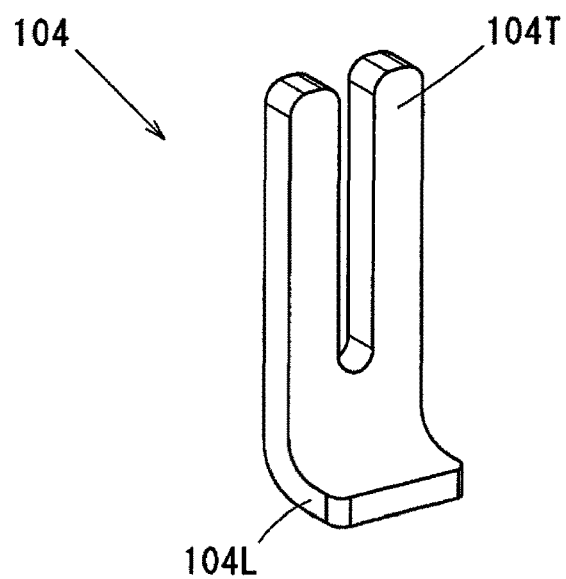
FIG. 6 is a perspective view of the seat component of FIG. 5 in the related art.

With reference to FIG. 2, one surface (also referred to as a front surface) 5Af of the contacting portion 5A and one surface (also referred to as a front surface) 5Bf of the engaging portion 5B are planar and are flush with each other, and the other surface (also referred to as a back surface) 5Ab of the contacting portion 5A and the other surface (also referred to as a back surface) 5Bb of the engaging portion 5B, which are parallel to and are opposite from the one surface 5Af of the contacting portion 5A and the one surface 5Bf of the engaging portion 5B, respectively, in the axial direction of the valve element 4, are planar and are flush with each other. With reference to FIGS. 2 and 4, the engaging portion 5B engages the two portions (also referred to as a first portion and a second portion) 12aa, 12ab of the first body 3A, which form the one opening 12a, in a state where a distal end of the seat component 5 (more specifically, distal ends 14ad, 14bd of two long sections 14a, 14b of the seat component 5 described later) reaches the other opening 12b after insertion of the distal end of the seat component 5 through the one opening 12a. Furthermore, in the state where the engaging portion 5B engages the two portions 12aa, 12ab of the first body 3A, the second body 3B covers the one opening 12a and contacts the engaging portion 5B (more specifically, the predetermined portion 3Ba of the second body 3B contacts the engaging portion 5B).

Furthermore, in a plan view of the seat component 5 (see FIG. 4), the seat component 5 is symmetrical about the symmetry axis S, and the seat component 5 is received in the receiving region 12 such that the symmetry axis S is perpendicular to the axial direction of the valve element 4. More specifically, the seat component 5 includes two long sections (also referred to as one long section and the other long section, respectively or a first elongated section and a second elongated section, respectively) 14a, 14b, a base section 15 and two short sections (also referred to as one short section and the other short section, respectively, or a first projection and a second projection, respectively) 16a, 16b. The long sections 14a, 14b are relatively long and extend parallel to each other from the base section 15 in an axial direction of the symmetry axis S such that the symmetry axis S is centered between the long sections 14a, 14b. The short sections 16a, 16b respectively project away from each other from the base section 15 of the seat component 5 in a corresponding projecting direction (see a transverse direction of FIG. 4), which is perpendicular to each of the axial direction of the symmetry axis S and the axial direction of the valve element 4, in the plane that is parallel to the one surface 5Af of the contacting portion 5A and the one surface 5Bf of the engaging portion 5B. The long sections 14a, 14b function as the contacting portion 5A, and the base section 15 and the short sections 16a, 16b function as the engaging portion 5B.

Hereinafter, the engaging portion 5B will be described further while an upper side of FIGS. 1 to 4, at which the distal ends 14ad, 14bd of the long sections 14a, 14b are located, is defined as one side in the axial direction of the symmetry axis S, and a lower side of FIGS. 1 to 4, at which the base section 15 and the short sections 16a, 16b are located, is defined as the other side in the axial direction of the symmetry axis S.

With respect to the cross section shown in FIG. 4, an upper edge segment 16aa of a peripheral edge of the one short section 16a, which is located on the one side in the axial direction of the symmetry axis S, is smoothly continuous with a side edge of the one long section 14a and is recessed. A part of the upper edge segment 16aa contacts the portion 12aa of the first body 3A, which is a part of an opening edge of the one opening 12a. Similarly, an upper edge segment 16ba of a peripheral edge of the other short section 16b, which is located on the one side in the axial direction of the symmetry axis S, is smoothly continuous with a side edge of the other long section 14b and is recessed. A part of the upper edge segment 16ba contacts the portion 12ab of the first body 3A, which is another part of the opening edge of the one opening 12a. Thereby, a height Ha of the short section 16a, which is measured from a bottom (a bottom surface) 5Ba of the engaging portion 5B in a direction parallel to the symmetry axis S, is progressively reduced in the projecting direction of the short section 16a (the left direction in FIG. 4), which is parallel to the transverse direction shown in FIG. 4. Similarly, a height Hb of the short section 16b, which is measured from the bottom (the bottom surface) 5Ba of the engaging portion 5B in the direction parallel to the symmetry axis S, is progressively reduced in the projecting direction of the short section 16b (the right direction in FIG. 4), which is parallel to the transverse direction shown in FIG. 4.

Furthermore, a lower edge segment 16ab of the peripheral edge of the one short section 16a, which is located on the other side in the axial direction of the symmetry axis S, and a lower edge segment 16bb of the peripheral edge of the other short section 16b, which is located on the other side in the axial direction of the symmetry axis S, are continuous with a lower edge segment 15b of the base section 15, which is located on the other side in the axial direction of the symmetry axis S, so that these lower edge segments 15b, 16ab, 16bb extend linearly in the transverse direction (see FIG. 4). Furthermore, these lower edge segments 15b, 16ab, 16bb are configured to contact the predetermined portion 3Ba of the second body 3B. In other words, the bottom 5Ba of the engaging portion 5B extends straight from the one short section 16a to the other short section 16b, and thereby the bottom 5Ba of the engaging portion 5B is configured to make a surface-to-surface contact relative to the predetermined portion 3Ba of the second body 3B. Alternatively, the bottom 5Ba of the engaging portion 5B may be configured to make a line contact relative to the predetermined portion 3Ba of the second body 3B.

Thereby, the base section 15 and the short sections 16a, 16b function as the engaging portion 5B.

Advantages of Embodiment

In the seat component 5 of the valve device 1 of the present embodiment, the one surface (the front surface) 5Af of the contacting portion 5A and the one surface (the front surface) 5Bf of the engaging portion 5B are planar and are flush with each other, and the other surface (the back surface) 5Ab of the contacting portion 5A and the other surface (the back surface) 5Bb of the engaging portion 5B, which are parallel to and are opposite from the one surface 5Af of the contacting portion 5A and the one surface 5Bf of the engaging portion 5B, respectively, in the axial direction of the valve element 4, are planar and are flush with each other. In other words, the front surface (i.e., the one surfaces 5Af, 5Bf) and the back surface (i.e., the other surfaces 5Ab, 5Bb) of the seat component 5 are planar along an entire extent of the seat component 5, which is measured in the axial direction of the symmetry axis S. The engaging portion 5B engages the two portions 12aa, 12ab of the first body 3A, which form the one opening 12a, in the state where the distal end of the seat component 5 reaches the other opening 12b after insertion of the distal end of the seat component 5 through the one opening 12a.

Furthermore, in the state where the engaging portion 5B engages the portions 12aa, 12ab of the first body 3A, the second body 3B covers the one opening 12a and contacts the engaging portion 5B.

Thereby, the engaging portion 5B engages the three portions 12aa, 12ab, 3Ba of the body 3, so that the movement of the seat component 5 is effectively limited. Thus, the removal (detachment) of the seat component 5 from the body 3 can be limited, and the movement of the seat component 5 in the direction parallel to the plane of the one surface 5Af of the contacting portion 5A and the one surface 5Bf of the engaging portion 5B can be limited.

(Modifications)

The present disclosure should not be limited to the above embodiment, and the above embodiment may be modified in various ways.

For example, in the valve device 1 of the above embodiment, the receiving region 12 has the two openings 12a, 12b. Alternatively, the receiving region 12 may have three or more openings. Furthermore, the engaging portion 5B engages the two portions 12aa, 12ab of the one opening 12a. Alternatively, the engaging portion 5B may engage three or more portions of the one opening 12a.

Additional advantages and modifications will readily occur to those skilled in the art. The present disclosure in its broader terms is therefore not limited to the specific details, representative apparatus, and illustrative examples shown and described. Some or all of the features of any one or more of the embodiments described above may be combined with some or all of the features of another one or more of the embodiments described above within the principle of the present disclosure.

What is claimed is:

1. A valve device comprising:
    a body that forms an oil pressure circuit, which is configured to supply an oil pressure to a friction element of a transmission of a vehicle;
    a valve element that is in a form of a spool and is received in a hole of the body in a manner that enables movement of the valve element in an axial direction of the valve element; and
    a seat component that is in a form of a plate and limits removal of the valve element from the hole of the body toward one side in the axial direction of the valve element, wherein:
    the body includes at least a first body, in which the hole is present, and a second body, which is formed separately from the first body;
    the first body has a receiving region that receives the seat component while the hole opens to the receiving region on the one side in the axial direction of the valve element;
    the receiving region has at least two openings that open to an outside of the first body and are configured to enable insertion of a plate that has a plate thickness, which is equal to a plate thickness of the seat component, through the first body in a state where a plane of the plate is kept to be perpendicular to the axial direction of the valve element;
    the seat component is placed on the one side of the valve element in the axial direction of the valve element in a state where a plane of the seat component is perpendicular to the axial direction of the valve element;
    the seat component includes a contacting portion, which is configured to contact the valve element, and an engaging portion, which is configured to engage the body;
    a front surface of the contacting portion and a front surface of the engaging portion are entirely planar along a common plane, and a back surface of the contacting portion and a back surface of the engaging portion, which are parallel to and are opposite from the front surface of the contacting portion and the front surface of the engaging portion, respectively, in the axial direction of the valve element, are entirely planar along a common plane;
    the engaging portion is configured to engage at least two portions of the first body, which form one of the at least two openings, in a state where a distal end of the seat component reaches another one of the at least two openings after insertion of the distal end of the seat component through the one of the at least two openings; and
    the second body covers the one of the at least two openings and contacts the engaging portion in a state where the engaging portion engages at least two portions of the first body.

2. The valve device according to claim 1, wherein:
    the one of the at least two openings and the another one of the at least two openings are opposed to each other in a predetermined direction, which is perpendicular to the axial direction of the valve element;

the at least two portions of the first body include a first portion and a second portion; and the engaging portion includes a first projection and a second projection that are configured to respectively engage the first portion and the second portion of the first body in the predetermined direction while the first projection and the second projection respectively project away from each other from a base section of the seat component in a corresponding projecting direction, which is perpendicular to each of the predetermined direction and the axial direction of the valve element, in a plane that is parallel to the front surface of the contacting portion and the front surface of the engaging portion.

3. The valve device according to claim 2, wherein a height of each of the first projection and the second projection, which is measured from a bottom of the engaging portion in the predetermined direction, is progressively reduced in the corresponding projecting direction.

4. The valve device according to claim 3, wherein the bottom of the engaging portion extends straight from the first projection to the second projection.

5. The valve device according to claim 1, wherein the contacting portion includes two long sections, which are parallel to each other and project from the engaging portion.

* * * * *